(12) United States Patent
Chen

(10) Patent No.: US 6,465,757 B1
(45) Date of Patent: Oct. 15, 2002

(54) LASER JOINING METHOD AND A DEVICE FOR JOINING DIFFERENT WORKPIECES MADE OF PLASTIC OR JOINING PLASTIC TO OTHER MATERIALS

(75) Inventor: Jie-Wei Chen, Alpnach Dorf (CH)

(73) Assignee: Leister Process Technologies (CH)

( * ) Notice: Subject to any disclaimer, the term of this patent is extended or adjusted under 35 U.S.C. 154(b) by 0 days.

(21) Appl. No.: 09/488,819

(22) Filed: Jan. 20, 2000

(30) Foreign Application Priority Data

Jan. 28, 1999 (EP) ............................................. 99101816

(51) Int. Cl.[7] .......................... B23K 26/00; B23K 26/14
(52) U.S. Cl. .............................. 219/121.63; 219/121.6; 219/121.64; 219/121.69
(58) Field of Search ...................... 219/121.6, 121.63, 219/121.64, 121.69, 121.83, 121.85; 156/272.2, 272.8

(56) References Cited

U.S. PATENT DOCUMENTS

| | | | | |
|---|---|---|---|---|
| 4,429,211 A | * | 1/1984 | Carstens et al. ...... | 219/121 LC |
| 4,636,609 A | * | 1/1987 | Nakamata ............. | 219/121 LD |
| 4,857,699 A | * | 8/1989 | Duley et al. ........... | 219/121.85 |
| 4,879,450 A | * | 11/1989 | Valentin et al. ........ | 219/121.64 |
| 5,272,309 A | * | 12/1993 | Goruganthu et al. ... | 219/121.63 |
| 5,279,693 A | * | 1/1994 | Robinson et al. ........ | 156/272.8 |
| 5,292,559 A | * | 3/1994 | Joyce, Jr. et al. ........... | 427/597 |
| 5,533,146 A | * | 7/1996 | Iwai ............................. | 382/150 |
| 5,624,585 A | * | 4/1997 | Haruta et al. ........... | 219/121.63 |
| 5,650,078 A | * | 7/1997 | Hamura et al. ........ | 219/130.01 |
| 5,739,502 A | * | 4/1998 | Anderson et al. ...... | 219/121.71 |
| 5,770,123 A | * | 6/1998 | Hatakeyama et al. ...... | 264/1.21 |
| 5,840,147 A | * | 11/1998 | Grimm ..................... | 156/272.2 |
| 5,893,959 A | * | 4/1999 | Muellich ................. | 156/272.8 |
| 5,908,719 A | * | 6/1999 | Guckel et al. ................ | 430/22 |
| 5,938,953 A | * | 8/1999 | Jurca ..................... | 219/121.83 |
| 6,042,738 A | * | 3/2000 | Casey et al. .................. | 216/63 |
| 6,054,072 A | * | 4/2000 | Bentley et al. .............. | 264/1.9 |
| 6,058,132 A | * | 5/2000 | Iso et al. ..................... | 372/108 |
| 6,193,833 B1 | * | 2/2001 | Gizowski et al. ......... | 156/272.8 |
| 6,417,481 B2 | * | 7/2002 | Chen et al. .............. | 219/121.6 |

FOREIGN PATENT DOCUMENTS

EP 0472850 3/1992

OTHER PUBLICATIONS

Potente H Et Al.: "Laserschweissen Von Thermoplasten", Bd. 46, Nr. 9, Sep. 1, 1995, Seiten 42–44 46, XP 000535361.

* cited by examiner

Primary Examiner—Tom Dunn
Assistant Examiner—L. Edmondson
(74) Attorney, Agent, or Firm—Bachman & LaPointe, P.C.

(57) ABSTRACT

A method and a device for laser joining of plastics or for joining plastics to other materials, which are brought into contact with pressure, with the workpiece closest to the laser beam source being largely transparent for the laser beam, and the second workpiece being as absorbent as possible. By producing a laser beam shaped in the form of a line on the contact surface between the workpieces and by a relative movement of the laser beam relative to the workpieces, designed according to the desired joint seam structure, the workpieces are bonded together accurately only in the desired joining areas. This permits a highly accurate bonding with the smallest possible joint seam distances, so that even parts for micro-systems engineering can also be produced with a short cycle time.

16 Claims, 6 Drawing Sheets

LASER JOINING METHOD AND A DEVICE FOR JOINING DIFFERENT WORKPIECES MADE OF PLASTIC OR JOINING PLASTIC TO OTHER MATERIALS

BACKGROUND OF THE INVENTION

The present invention concerns a laser joining method of joining different workpieces made of plastic or joining plastic to other materials, where the top workpiece facing the laser source is made of a material that is transparent for the laser beam, and the second workpiece is made of a material that absorbs the laser beam, so that the contact surfaces of the two workpieces adjacent to one another are fused and bonded to one another in the subsequent cooling under pressure. This invention also concerns a device for carrying out this method.

This method is essentially known from U.S. Pat. No. 4,636,609, for workpieces made of plastic. Meanwhile, there are numerous other patents describing various applications of this method as well as the equipment for carrying out this method in joining specially designed workpieces. For example, International Patent WO 95/26869 as well as the publications cited in the respective Search Report can be mentioned here.

With these known methods, plastic sheets, films and injection molded parts are welded by sharply bundled laser beams, using a laser beam focused in a spot for welding and fusing the plastic materials. The path of the weld is implemented by a programmable beam guidance of the laser beams or by moving the workpieces. So far, there is no effective method of joining surfaces or finely structured objects, such as those needed as part of micro-mechanics or micro-systems engineering, where only the desired zone is to be bonded. One possible alternative to this technical desire would be such a method where the entire surface is bonded by two-dimensional scanning of a point-source laser beam. One disadvantage of this method is that the process time is greatly increased by fine scanning. Another problem is the quality of the joint seam, which is influenced by the scanning distance as well as the scanning rate of the laser spot and the control performance of the laser power. A high-quality joint requires a dense scanning distance and a low scanning rate because of the dynamic properties of the motion system. At high rates of movement, the joint seam can be very problematical. This often leads to unsatisfactory joining results, in particular at the turning point, where there is a boundary line between the joined area and the unjoined area. Another disadvantage of two-dimensional joining with point-focused laser beam is the distribution of the beam intensity, because the gaussian intensity distribution causes irregular melting.

U.S. Pat. No. 4,069,080 describes a method and a device where a laser line is focused on a plastic by using a $CO_2$ laser and appropriate optical equipment, and thus a bag is produced by welding two film halves.

Therefore, the object of the present invention is to propose a possible method of producing a high-quality two-dimensional joining of objects placed one on top of the other, with at least one body being made of plastic, with a well-defined joining zone.

SUMMARY OF THE INVENTION

This object is achieved according to this invention. The present invention is based on the idea that to join the workpieces in a certain joining area, a mask of a material that is opaque to the laser beam is arranged between the laser source and the workpieces to be joined, the structure of said mask being greater than the wavelength of the laser beam used. The term "joining" as used here is understood below to refer to welding, fusing, gluing, bonding or the like. In addition, the laser source is aimed at the contact surface in such a way as to form a line on it. In addition, the laser beam and the workpieces are moved relative to one another. Essentially, a Nd:YAG laser, a $CO_2$ laser or a semiconductor laser with laser beams having a wavelength of 0.7 to 10.6 $\mu m$ can be used, but appropriate optical measures must be taken to ensure that a linear laser beam is provided at the contact surface. The workpieces are pressed together by the inherent pressure or by means of a suitable clamping device by a known method. A mask, e.g. in the form of a thin metal plate or a metal layer vaporized onto a carrier, is applied to the workpieces; said mask has recesses through which the laser beam can pass in accordance with the structures to be joined. The structures may be less than a millimeter in size. As long as the dimensions of the fine structure of the mask amount to 5–10 times the wavelength of the beam used, there will not be any motion effect that would have a negative effect on the laser results. The laser beam penetrates essentially at a right angle or at an angle which has only an insignificant effect on the boundary line of the joining area, through the openings in the mask and the top workpiece, penetrating as far as the contact surface between the two workpieces. The beams striking the mask are reflected back. The possible joint seam structures are determined mainly by the mask and the thermal properties of the material. Due to the relative movement between the laser beam and the workpieces, which can be implemented by moving the laser source or the workpieces or by a suitably controlled laser beam guidance device, the laser beam penetrates through the openings in the mask either continuously or completely (in the case of small joint areas with same line width with the joining area), yielding a correspondingly structured joining of the workpieces at the desired joining zones in the contact area. Depending on the arrangement and application, the mask with the workpieces can be moved relative to the laser beam or the workpieces can be moved together with the laser beam and the mask.

This method thus makes it possible to join plastic sheets, injection molded parts or films to one another or to other materials in a short cycle time and with a high quality or to accurately join workpieces having a fine structure with a flat seam without damaging the structuring on the desired zone. Thus, for example, linear contours of any desired shape, which previously had to be worked using a point-source laser beam, can be implemented easily due to the linear design of the laser beam by passing it once over a mask of a suitable design.

The laser beam is preferably guided perpendicular to the joining area of the contact surface, to achieve the most accurate possible imaging of small structures in particular and to prevent unnecessary shadow effects.

The workpieces are advantageously pressed together at a pressure above the inherent pressure so that they are in good thermal contact with one another and are held together with a joining pressure because of the thermal expansion of the molten material during the melting operation due to the laser treatment.

To be able to guide or stop the spread of the liquid melt by additional structuring, a projection may be provided on one workpiece in the direction of the other workpiece adjacent to the joining area according to another advantageous embodiment, so that when the two workpieces are pressed together, a cavity is formed between the projection and the contact surfaces of the workpieces to be joined. As an alternative, such projections may also be provided on the workpieces. As soon as the joining area has been irradiated by the laser beam, the liquid melt is diverted into this cavity, because the pressure is much lower inside this cavity than in the contact area where the two workpieces come in contact under pressure. This makes it possible to prevent an unwanted direction of flow of the melt into areas that are to remain free. This is a great advantage especially with microminiature parts. According to another preferred embodiment of the method according to this invention, the relative velocity between the laser source and the workpieces is chosen to be as high as possible, depending on the maximum laser power needed to achieve the required melting point. This results in an optimization with the goal of imaging the mask structure sharply on the desired joining zone by applying the thermal energy required for the melting process to the melting zone only briefly. Thus, the molten material cools immediately after the laser treatment and solidifies before the adjacent material begins to flow.

The line width of the laser beam is advantageously selected to correspond to the width of the joining area. This can be achieved by one or more laser sources arranged side by side in accordance with the power of the laser source. With an increase in the capacity of the laser source, the size of the joining area which is irradiated with the laser all at once can also be increased. This is especially applicable to small joining areas in the cm$^2$ range. Here again, $CO_2$ lasers or semiconductor lasers may also be used as laser sources. This permits heating of the desired joining area all at once.

According to an especially preferred embodiment of this method, the linear laser beam is generated by at least one semiconductor laser (diode laser). Depending on the desired line length, a diode laser or a row of several of these diode lasers arranged side by side may be used. According to another embodiment of this method, this makes it possible to adjust the line length by the distance of the laser source from the contact surface with a corresponding adjustment of the laser power for the required melting point. To do so, the laser beam is collimated in one axis (fast axis) and divergence is allowed in the other axis (slow axis). In addition, the line width of the laser beam can be kept essentially constant with a change in the distance of the laser source from the contact surface. A trapezoidal beam emitted by a diode laser having essentially a narrow elongated cross section is produced through corresponding known optical arrangements on the diode laser, so that the desired line width can be adjusted and the required energy density can be achieved by adjusting the laser power at any desired distance of the laser source from the contact surface.

An especially economical method is achieved by the fact that the relative movement between the laser beam and the workpieces is created by a mirror that can be pivoted or rotated about an axis parallel to the workpieces. The movement of this mirror can be controlled rapidly by methods known in optics, so a very short cycle time can be achieved.

In a preferred embodiment, the device according to this invention which makes it possible for this method to be carried out has a laser source, such as a diode laser, which generates a laser beam with an elongated cross section as a laser line, and according to another preferred embodiment, and it has a mirror which can be pivoted or rotated about an axis parallel to the contact surface, is arranged above the contact surface, deflects the laser beam from the laser source to the contact surface and can be operated by means of a drive; it also has a clamping device with the workpieces to be joined and the mask held in it, with the plate of the clamping device facing the laser source being made of a material that is transparent for the laser beam.

BRIEF DESCRIPTION OF THE DRAWINGS

This invention is explained in greater detail below on the basis of embodiments in conjunction with the accompanying drawings, which show.

DETAILED DESCRIPTION OF PREFERRED EMBODIMENTS

Figure 1:
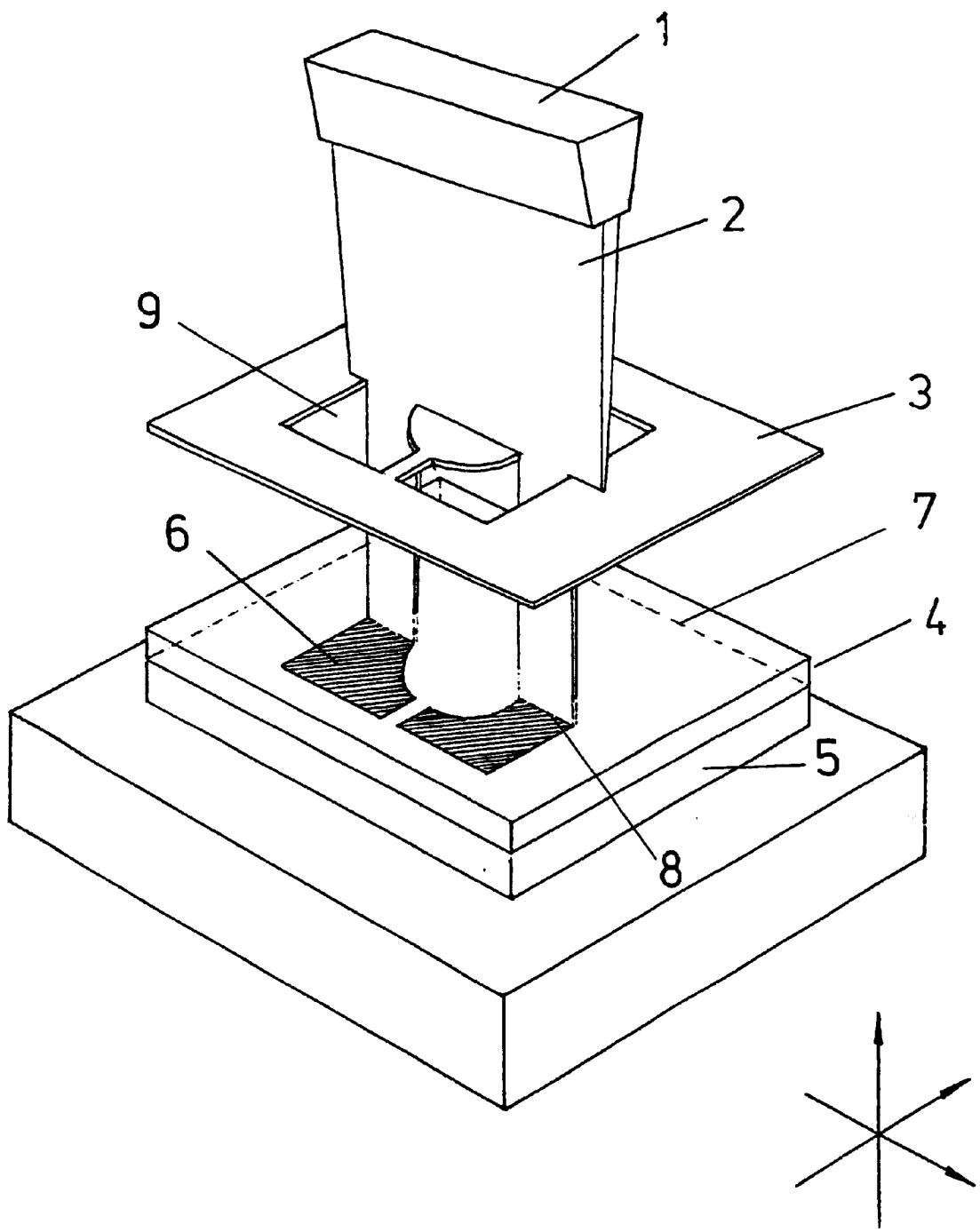
FIG. 1 a basic arrangement for welding plastic sheets with joining areas predetermined by means of a mask.

FIG. 1 shows an arrangement for two-dimensional welding of plastic sheets 4, 5 that are to be welded only in a certain joining area 6 by means of a laser beam 2 and a mask 3. The arrangement consists of a laser source 1, e.g., one or more semiconductor lasers (diode lasers) arranged in a line, their emitted laser light being collimated directly with a micro-lens (not shown here) and focused on a line. The laser source 1 is placed so that the laser beam 2 is brought into the joint area 6 of the contact zone 7 between the two plastic sheets 4, 5 as a laser curtain at a right angle through the mask 3. As required for this method, the plastic sheet 4 is transparent for the laser light and the plastic sheet 5 is absorbent for the laser light. The laser beam 2 is moved continuously relative to the mask 3 and the plastic sheets 4, 5, so that the plastic sheets 4, 5 are brought to a molten state in the joining area 6 directly below the laser line 8, and then they solidify after cooling. The shaded joint area 6 represents the weld joint already formed due to the laser light passing through the opening 9 in the mask 3.

Figure 4:
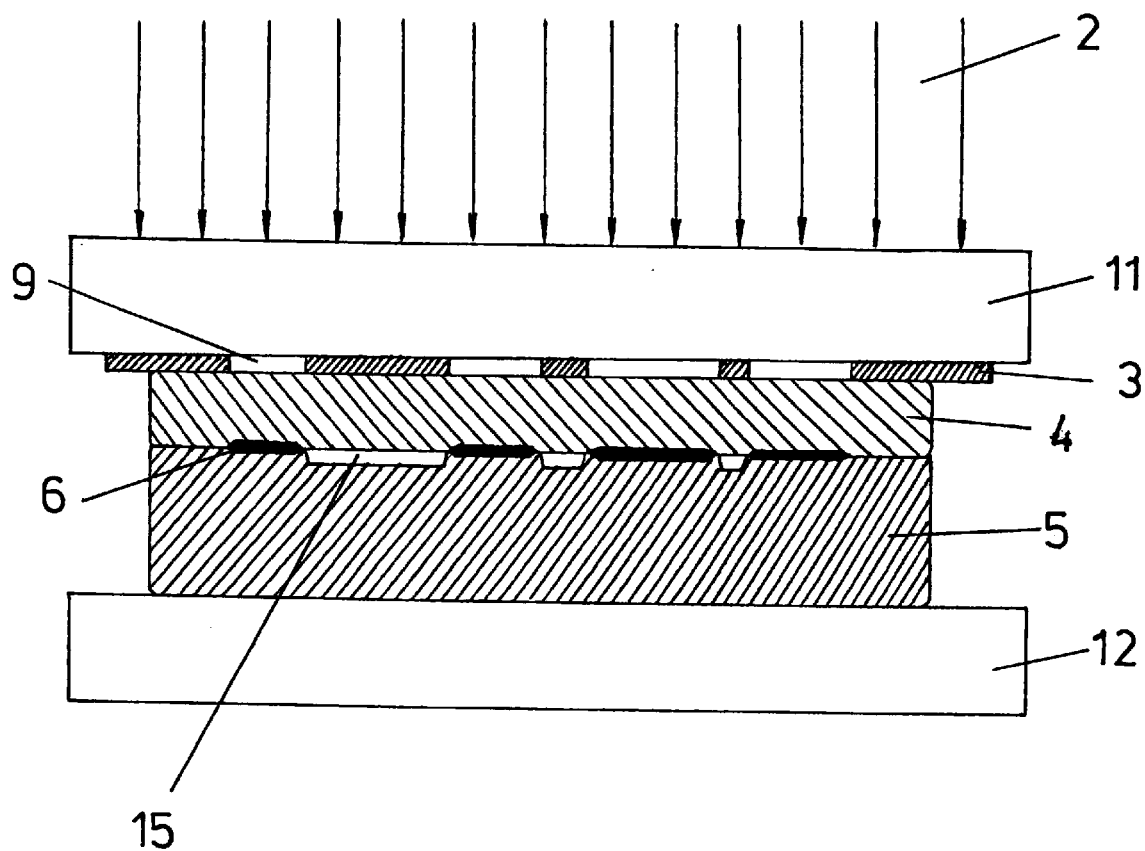
FIG. 4 a basic device for welding with the mask technique.
Figure 6:
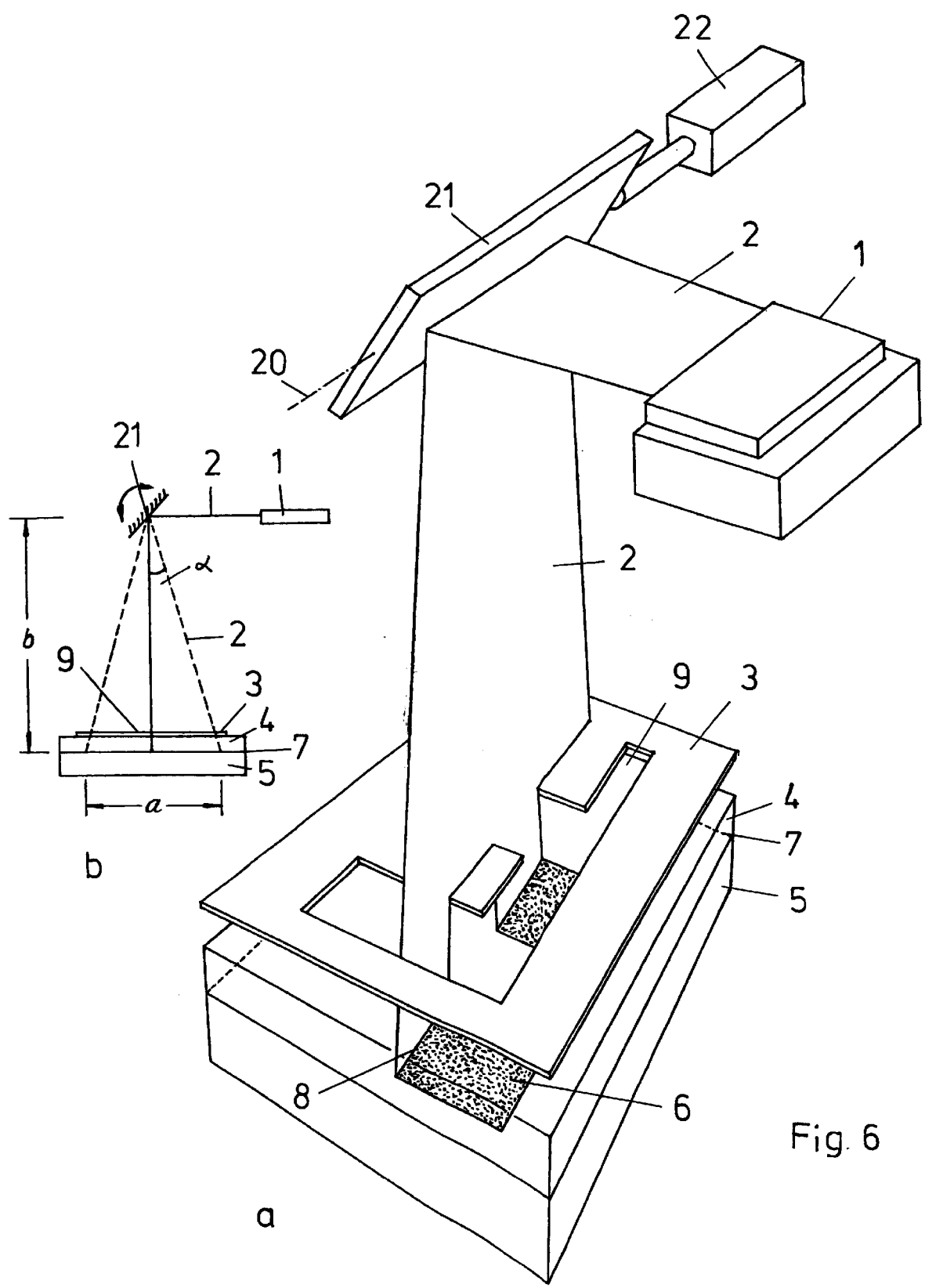
FIG. 6 the basic design of a device with a pivotable mirror above the workpieces.

In FIG. 1, the mask 3 is shown at a distance from the plastic sheet 4 for the purpose of illustration. As FIG. 4 shows, the plastic sheets 4, 5 and the mask 3 are pressed together by a clamping device (not shown in detail here) comprising two stable flat sheets 11, 12. This is then either mounted immovably as a complete unit or attached to a linear table (not shown). Another possibility is shown in FIG. 6 and is discussed in conjunction with it. In FIG. 4, the top sheet 11 is made of a quartz glass or sapphire glass or is made of a sheet of plastic that allows both the laser light and the thermal radiation up to a wavelength of 1.5 $\mu$m or 8 $\mu$m to pass through. This clamping device ensures that the plastic sheets 4, 5 to be welded together are in good thermal contact and are held together at the existing joining pressure during the melting operation by the laser radiation because of the thermal expansion of the melt. The high transmission of the top clamping plate 11 in the infrared range permits a determination of the temperature in the joining area 6, so the welding process can be controlled optimally.

Figure 2:
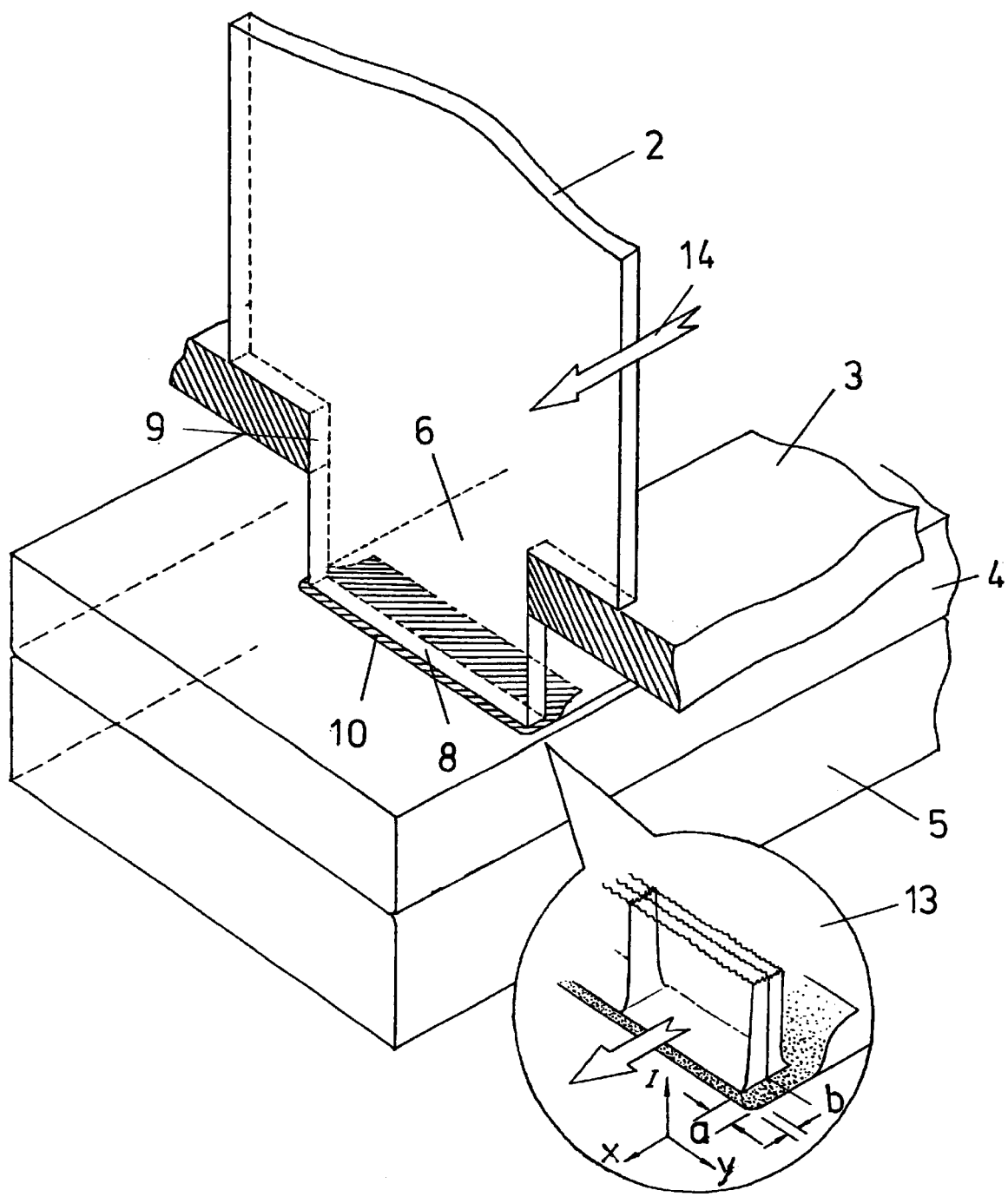
FIG. 2 the geometry of the joining area during the two-dimensional welding operation.

In FIG. 2, the two-dimensional welding operation is shown in greater detail. The curtain-like laser beam 2 irradiates the area 8 through the opening 9 in mask 3. Due to the heating of the material along the laser line 8, there is an area 10 of spreading, which is explained in greater detail below in conjunction with the representation of light intensity I in circle 13. The arrow 14 indicates the direction of movement of the laser beam 2. The geometry of the welding zone is determined in general by these factors:

the welding process, the depth of melting, the irradiation zone, the thermal diffusion properties of the joining material and the laser power employed. The spreading of the melt and the parameters a and b in FIG. 2 can usually be explained physically. For a welding process with a laser power P (watts) and a velocity (m/sec), the parameters of spreading a and b are related by the following welding condition (see "CO$_2$ Laser Welding of Polymers," W. W. Duley & R. E. Mueller, Polymer Engineering and Science, vol. 32, no. 9 (1992) pp. 582–585):

$$a, b \sim \frac{P}{vd\rho C_p T_m}$$

where P is the density of the joining material (kg/m$^{-3}$), $c_p$ is the thermal capacity (J/kg$^{-1}$·K$^{-1}$), d is the depth of melting (m) and $T_m$ is the melting point (K); in other words, a controllable spreading of the melt can be achieved by optimizing the laser power P, the velocity v of movement and the depth d of melting.

Figure 3:
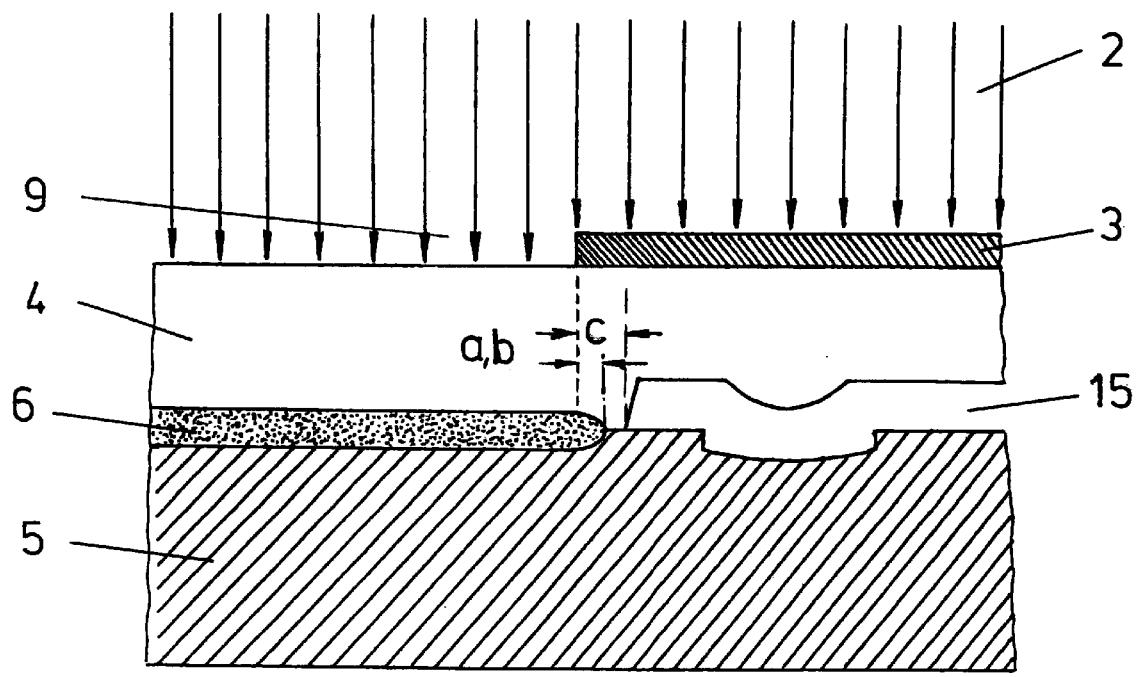
FIG. 3 an enlarged detail of finely structured plastic sheets and the expansion of the melt.

FIG. 3 shows an enlarged detail of a fine structuring, e.g. for elements of micro-engineering and micro-systems engineering, also showing the spreading of the melt. The extent to which the structure 15 must be covered by the mask 3 depends on the plastic materials used and the optimized welding parameters P and v. In any case, it is important to be sure that no melt enters the weld-free zone 15, because otherwise the functioning of the part cannot be guaranteed. The excessive coverage c between the weld-free zone 15 and the edge of the opening 9 in the mask 3 is necessary because spreading of the melt cannot be completely ruled out by process optimization. The rule of thumb that must be followed in mask design is c≧2a, b.

Studies using a diode laser with a power of 25 W, producing laser beams with a wavelength of 940 nm which are very suitable for most plastic materials, and using the plastic material polycarbonate (PC) have shown that good results can be achieved with regard to the melting behavior. Thus, channels with a width of 1.2, 1.0 and 0.8 mm which were covered by a mask were flooded by the melt flowing outward from the welding zone with an increase in the laser energy. It should also be pointed out that the melt spreads uniformly outward at the edge bordered by mask 3 and also at the line edge of the laser beam 2. Optimization with the goal that the mask structure is produced sharply in the desired melting zone can be achieved by applying a sufficient amount of thermal energy to the melting zone within a short cycle time. As a result, the liquid melt cools and solidifies immediately after the laser treatment before beginning to flow. Therefore, it is important to observe the shortest possible laser treatment time as a function of the available power of the laser source, i.e., the highest possible relative speed between the laser beam and the mask with the workpiece should be established, but of course, the power must be sufficient to at least initiate a melting process.

Figure 5:
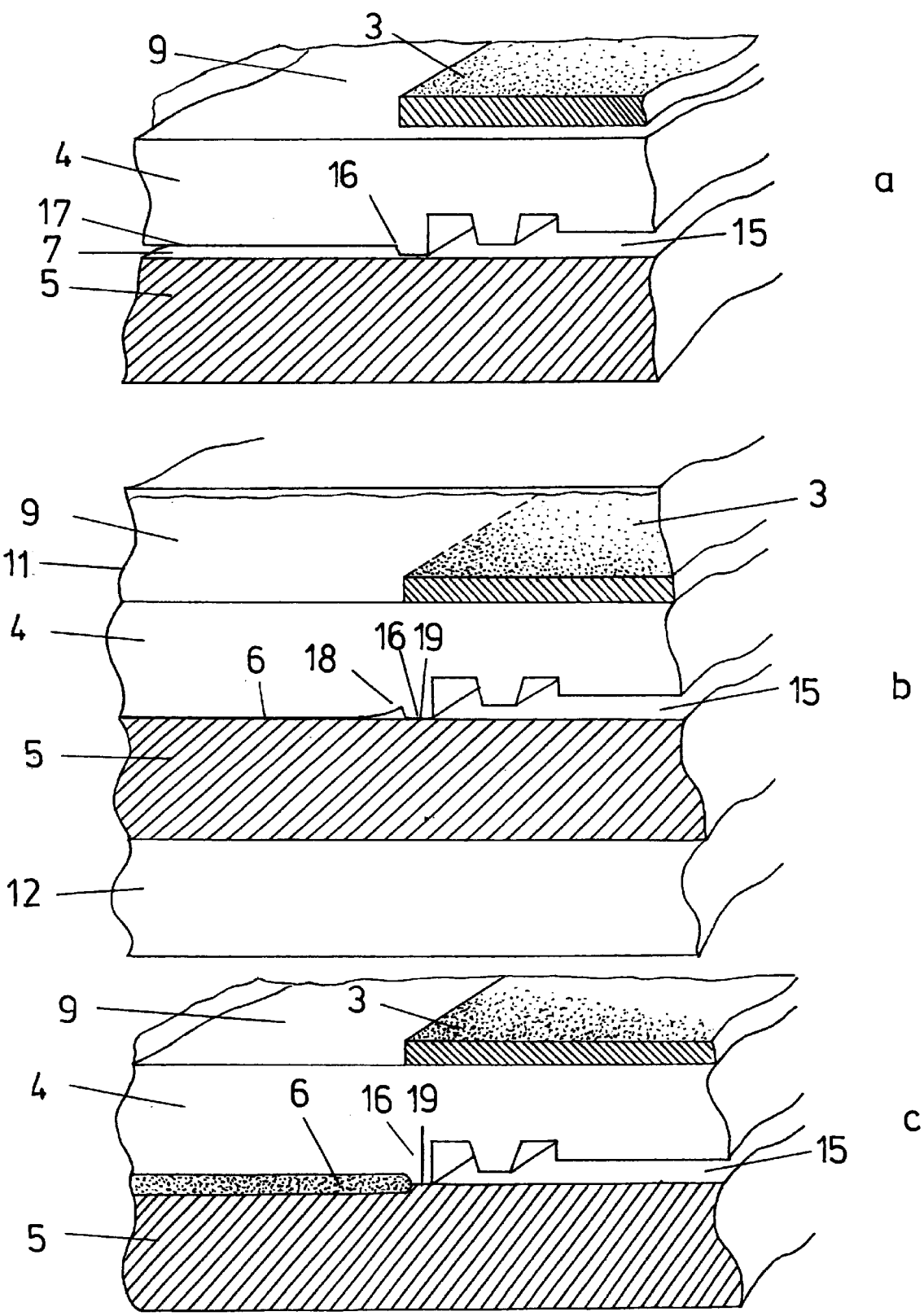
FIG. 5 an embodiment for limiting the liquid melt in unwanted areas.

FIG. 5 shows a diagram of one possibility, which makes it possible to control or stop the spreading of the liquid melt through additional structuring. FIG. 5a shows only the mask 3 and the plastic sheets 4, 5 in a press-free situation, where one of the sheets sheet 4 in this embodiment has an additional structuring in the form of a projection adjacent to the free structure 15. The projection 16 projects with respect to the lower side 17, which forms the contact surface with the top side of the plastic sheet 5. The edge of the opening 9 in the mask 3 coincides with the joining area 6 which ends at the projection 16. In FIG. 5b, the plastic sheets 4, 5 to be joined are pressed together tightly with clamping plates 11, 12, with the mask 3 being integrated into the top clamping plate 11. This forms a thin air slit 18 next to projection 16. As soon as the joining area 6 is treated with the laser beam, the liquid melt is diverted into this air slit space 18, because the pressure there is much lower than at the contact surface 19 between the projection 16 and the top side of the plastic sheet 5. Therefore, the desired penetration of the melt into the free space 15 can be prevented in a controlled manner. As shown in FIG. 5c.

FIG. 6 shows the basic design of a device with a mirror 21 arranged about an axis 20 parallel to the contact surface 7. Mirror 21, which can be adjusted very rapidly by means of a drive 22, causes the laser beam 2 to move over the mask 3. This method and this device permit a high laser treatment rate and a high cycle time without requiring expensive movement mechanisms such as a linear table. Therefore, the laser source 1 is also arranged above the join partners and a curtain-like laser beam 2 is generated with a small line width, as already shown in FIG. 1. This is accomplished by the fact that in the so-called fast axial direction, the beams produced by a semiconductor laser are collimated, and in the so-called slow axial direction, the beams with a small divergence angle are converted. The maximum length of the laser beam line in the contact surface 7 is obtained from the maximum length of the joining area. Due to the change in the working distance, the length of this laser line 8 can be adapted to the length of the joining area 6. By varying the power of the laser source, it is possible to adjust to the minimum required melting temperature. By using a laser beam 2 with an elongated cross section over the entire distance between laser source 1 and contact surface 7, it is possible to adapt to changes in the dimensions of the joining areas 6 to be welded.

To achieve the greatest possible accuracy, the mirror is arranged at the center above the mask 3 or the opening 9 in the mask 3. As shown in FIG. 6b, the result is accurate enough if the following condition is satisfied:

$$b \gg \frac{a}{2tg\alpha}$$

where b is the distance between the contact surface 7 and the mirror 21, a is the length of the joining area and α is half the spreading angle. Thus, this method and this device can be used for both large and small structures.

In the embodiments described here, laser beams with a wavelength of 0.7–10.6 μm are used.

What is claimed is:

1. A laser joining method of joining different workpieces made of plastic, or joining plastic to other materials, which comprises: making a top workpiece of a material that is transparent to the laser beam facing a laser source with a laser beam; making a second workpiece of a material that is absorbent for the laser beam, so that adjacent contact surfaces of the two workpieces begin to melt and are bonded together in subsequent cooling under pressure; including the step of arranging a mask of a material that is impermeable for the laser beam adjacent the workpieces between the laser source and the workpieces to be joined for bonding the workpieces in a joining area of the contact surfaces; wherein the structure of said mask is larger than the wavelength of the laser beam used, and the laser source is directed at the contact surfaces to provide an essentially vertical laser beam curtain at essentially a right angle through the mask in such a way that a laser line joining area is formed on said contact surfaces, heating and joining the workpieces by moving the laser beam and the workpieces relative to each other to move the laser line and to provide an extended joining area, wherein the laser beam is arranged at a right angle above the joining area of the contact surfaces, and wherein a linear laser beam is created by at least one semiconductor laser.

2. A method according to claim 1, wherein an additional joining pressure is applied when joining the workpieces to be bonded.

3. A method according to claim 2, wherein at least one workpiece has a projection in the direction of the other workpiece adjacent to the joining area, so that a cavity is formed between the contact surfaces to be bonded and the projection when the two workpieces are pressed together.

4. A method according to claim 1, wherein the relative velocity between the laser source and the workpieces is selected to be as high as possible as a function of the maximum laser power needed to achieve the required melting temperature.

5. A method according to claim 1, wherein the laser line width is selected to be essentially equal to the width of the joining area.

6. A method according to claim 1, wherein the length of the laser line is adjusted by the distance of the laser source from the contact surfaces and a corresponding adaptation of the laser power for the required melting temperature.

7. A method according to claim 1, wherein the width of the laser beam is kept essentially constant with a change in the distance of the laser source from the contact surfaces.

8. A method according to claim 1, wherein the relative movement between the laser beam and the contact surfaces is created by a mirror which can be pivoted or rotated about an axis parallel to the contact surfaces.

9. A method according to claim 1, wherein the laser beam is fixed and the mask together with the workpieces are moved.

10. A method according to claim 1, wherein the mask are fixed and the laser beam and workpieces are moved.

11. A method according to claim 1, wherein the workpieces melt along the laser line joining area and are bonded together in subsequent cooling under pressure.

12. A device for joining various planar workpieces with at least one workpiece with a microstructure made of plastic or joining plastics to other materials, including a planar top workpiece and a planar second workpiece, which comprises: a laser beam from a laser source; said laser beam is a laser beam with a fine elongated cross section being focused as a fine laser line on the joining area between said workpieces; a micro-structured mask made of a material that is impermeable to lasers adjacent the workpieces and between workpieces to be joined and the laser source; where the microstructure of the mask is larger than the wavelength of the laser beam used; said top workpiece facing the laser source made of a material that is transparent for the laser beam; and said second workpiece made of a material that is absorbent for the laser beam, so that adjacent contact surfaces of the two workpieces melt and are bonded together in subsequent cooling under pressure; means for clamping the workpieces to be joined together with the mask comprising a top pressure plate and a lower bottom plate, where at least the top pressure plate is transparent for said laser beam; means for a movement of the laser beam and the workpieces relative to one another to heat and join the workpieces by moving the focus line and to provide an extended joining area, wherein the laser beam is arranged at a right angle above the joining area of the contact surfaces, and wherein said laser beam is generated by at least one semiconductor laser.

13. A device according to claim 12, wherein the laser source delivers a laser beam with an elongated cross section corresponding to the required width, and wherein the beam is deflected by a mirror that can be pivoted or rotated about an axis parallel to the contact surfaces and is arranged above the mask and can be operated by a drive.

14. A device according to claim 12, including a fixed laser beam and movable mask and workpieces.

15. A device according to claim 12, including fixed workpieces and movable mask and laser beam.

16. A device according to claim 12, wherein the workpieces melt along the laser line joining area and are bonded together in subsequent cooling under pressure.

* * * * *